Patented Sept. 13, 1932

1,877,092

UNITED STATES PATENT OFFICE

HERMANN WAGNER, OF BAD SODEN AM TAUNUS, AND BARTHOLOMÄUS VOSSEN, OF FRANKFORT-ON-THE-MAIN-HÖCHST, GERMANY, ASSIGNORS TO GENERAL ANILINE WORKS, INC., OF NEW YORK, N. Y., A CORPORATION OF DELAWARE

YELLOW MONO-AZO DYESTUFF

No Drawing. Application filed June 11, 1929, Serial No. 370,153, and in Germany June 19, 1928.

The present invention relates to yellow mono-azo dyestuffs.

The new dyestuffs have the following general formula:

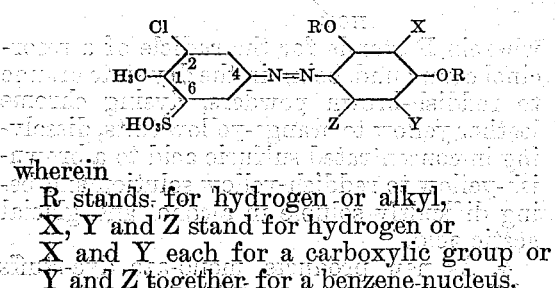

wherein
R stands for hydrogen or alkyl,
X, Y and Z stand for hydrogen or
X and Y each for a carboxylic group or
Y and Z together for a benzene nucleus.

The dyestuffs are obtainable by coupling 1 mol. of the diazo compound of the hitherto unknown 2-chloro-4-amino-1-methylbenzene-6-sulfonic acid with 1 mol. of resorcinol or substitution products or homologues thereof. The new dyestuffs have valuable properties. They are distinguished by a great coloring power and when being used for dyeing chrome leather have the great advantage of through-dyeing it.

The technical effect which is arrived at by using the new dyestuffs is due to their great intensity of color, the purity of the shades they give resembling those of basic phosphines and their capability of penetrating chrome leather.

The hitherto unknown 2-chloro-4-amino-1-methyl-benzene-6-sulfonic acid may be obtained by sulfonating 2-chloro-4-nitro-1-methyl-benzene (melting at 60° C.–61° C.) at a temperature of about 80° C.–90° C. in concentrated sulfuric acid containing 20 per cent of sulfuric anhydride, whereby the 2-chloro-4-nitro-1-methylbenzene-5-sulfonic acid is formed; the latter is precipitated as sodium salt from its sulfuric acid solution by means of common salt and subsequently reduced according to known methods, for instance by iron and hydrochloric acid.

The reaction takes the following course:

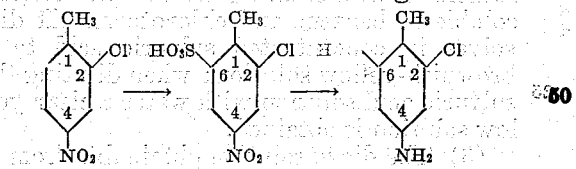

The following examples illustrate our invention; the parts being by weight:

(1) 221.5 parts of 2-chloro-4-amino-1-methylbenzene-6-sulfonic acid and 40 parts of caustic soda are dissolved in 10,000 parts of water. 70 parts of sodium nitrite are added and the solution is run while stirring into a mixture of 5,000 parts of ice and 350 parts of hydrochloric acid of 22° Bé. After the solution is run into the mixture the whole is stirred for one hour and the diazo solution is subsequently run, while stirring, into a solution of 110 parts of resorcinol and 100 parts of caustic soda in 4,000 parts of water. Stirring is continued for 2 hours until the coupling is finished, the solution is heated to 70° C., the dyestuff is salted out by adding common salt, filtered by suction and dried.

The dyestuff thus obtained has the following constitution:

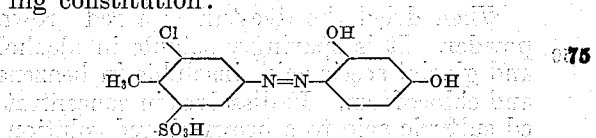

and is a light yellow powder. It dyes chrome leather a very pure orange yellow tint. As regards the pureness of shade it equals that of the basic phosphine dyestuffs.

The dyestuff is difficultly soluble in alcohol and in glacial acetic acid, insoluble in benzene and chloroform. It dissolves in concentrated sulfuric acid to a reddish-brown solution; when diluting the sulfuric acid solution with water a clear golden yellow solution is obtained.

(2) The diazo solution obtainable from 2- chloro-4-amino-1-methylbenzene-6-sulfonic acid in the manner indicated in example 1 is run at 15° C. into a solution of 226 parts of 1.3-dimethoxybenzene-2.4-dicarboxylic-acid and 100 parts of caustic soda in 4000 parts of water. The whole is stirred for 2 hours in order to complete the copulation, the solution is heated to 70° C., the coupling product is salted out, filtered and dried. The dyestuff thus obtained has the following constitution:

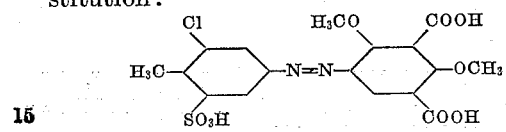

This dyestuff dyes chrome leather a tint which is a little more yellowish than that obtained according to Example 1, but its color is a little less intense; when dried it is an orange colored powder. It is difficultly soluble in alcohol and glacial acetic acid, insoluble in benzene and chloroform. It dissolves in concentrated sulfuric acid to a brownish-yellow solution; when diluting the sulfuric acid solution with water a clear yellow solution is obtained.

(3) The diazo solution obtainable from 2-chloro-4-amino-1-methylbenzene-6-sulfonic acid in the manner indicated in Example 1 is run at 15° C. into a solution of 160 parts of 1.3-dihydroxynaphthalene and 50 parts of caustic soda in 4000 parts of water. The whole is heated for two hours in order to accomplish the coupling; the solution of the dyestuff is heated to 70° C., the dyestuff is salted out by adding common salt, filtered by suction and dried.

The dyestuff thus obtained has the following constitution:

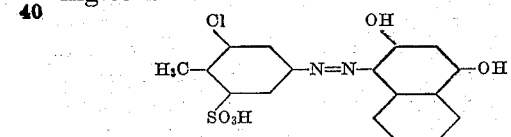

It dyes chrome leather a yellow tint being a little more dull than that obtainable from the dyestuff according to Example 1.

When dried the dyestuff is a red brown powder. It is sparingly soluble in alcohol and glacial acetic acid, insoluble in benzene and chloroform. It dissolves in concentrated sulfuric acid to a brownish-red solution; when diluting the sulfuric acid solution with water the dyestuff slowly separates in brown flakes.

We claim:

1. As new products, mono-azo dyestuffs of the following general formula:

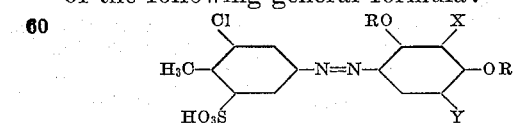

wherein R stands for hydrogen or CH₃ and X and Y stand for hydrogen or each for a carboxylic group, being when dried orange to light-brown powders, dyeing chrome leather pure yellow to orange yellow tints, dissolving in concentrated sulfuric acid to a brownish-yellow to reddish-yellow solution and being difficultly soluble in alcohol and glacial acetic acid.

2. As a new product, the mono-azo dyestuff of the following formula:

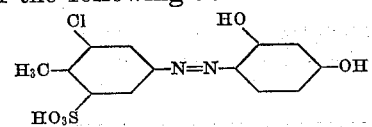

being in a dry state a light yellow powder, dyeing chrome leather a very pure orange-yellow tint and dissolving in concentrated sulfuric acid to a reddish-brown solution which on dilution with water turns clear golden-yellow.

3. As new products, mono-azo dyestuffs of the following general formula:

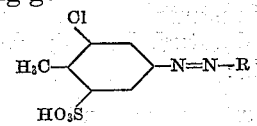

wherein R stands for the radicle of a resorcinol compound, being in the dry state orange to reddish-brown powders, dyeing chrome leather yellow to orange-yellow tints, dissolving in concentrated sulfuric acid to a brownish-yellow to reddish-yellow solution and being difficultly soluble in alcohol and glacial acetic acid.

4. As new products, mono-azo dye-stuffs of the following general formula:

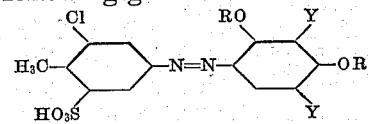

wherein R stands for hydrogen or alkyl and Y stands for hydrogen or for a carboxylic group, being in the dry state orange to reddish-brown powders, dyeing chrome leather yellow to orange-yellow tints, dissolving in concentrated sulfuric acid to a brownish-yellow to reddish-yellow solution and being difficultly soluble in alcohol and glacial acetic acid.

5. As a new product, the mono-azo dyestuff of the following formula:

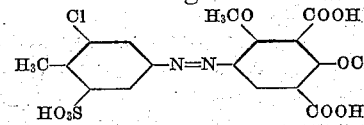

being in the dry state an orange powder, dyeing chrome leather an orange-yellow tint and dissolving in concentrated sulfuric acid to a brownish-yellow solution which on dilution with water turns clear yellow.

In testimony whereof, we affix our signatures.

HERMANN WAGNER.
BARTHOLOMÄUS VOSSEN.